G. W. KELLOGG.
MOTOR VEHICLE DEVICE.
APPLICATION FILED SEPT. 17, 1917.
1,317,626.
Patented Sept. 30, 1919.
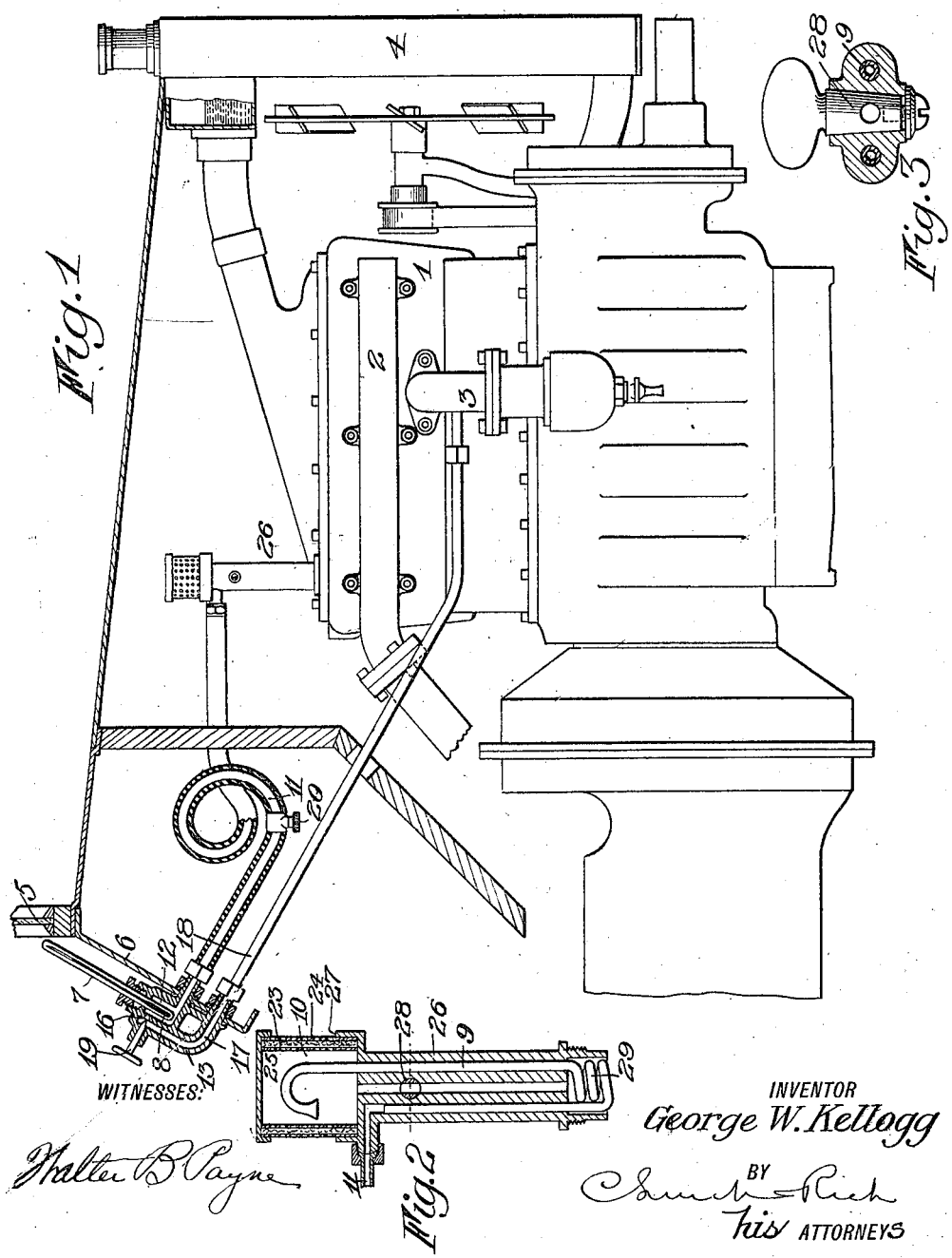
WITNESSES:
Walter B. Payne
INVENTOR
George W. Kellogg
BY
his ATTORNEYS

UNITED STATES PATENT OFFICE.

GEORGE W. KELLOGG, OF ROCHESTER, NEW YORK.

MOTOR-VEHICLE DEVICE.

1,317,626.  Specification of Letters Patent.  Patented Sept. 30, 1919.

Application filed September 17, 1917. Serial No. 191,717.

*To all whom it may concern:*

Be it known that I, GEORGE W. KELLOGG, of Rochester, in the county of Monroe and State of New York, have invented certain new and useful Improvements in Motor-Vehicle Devices; and I do hereby declare the following to be a full, clear, and exact description of the same, reference being had to the accompanying drawings, forming a part of this specification, and to the reference-numerals marked thereon.

My invention possesses several objects in the improvement of motor vehicle operation, and has to do with giving ample notice of the temperature conditions under which the engine is operating and also increasing the efficiency of the engine by keeping the valves and cylinders continually clean and securing more perfect combustion. In a more particular aspect, the principal object of my invention is to provide a temperature indicator controlled by the engine water jacket at its hottest point, and located so as to make it possible for the driver to obtain a reading easily under all conditions and at any time, without getting out of his seat. An additional object resides in utilizing air, or a mixture of air, with steam from the engine water jacket, to effect the temperature indication, and carrying this same air and steam, or air alone, to the intake manifold for decarbonizing the engine and improving the combustible mixture. To these and other ends the invention consists in certain improvements and combinations of parts, all as will be hereinafter more fully described, the novel features being pointed out in the claims at the end of the specification.

In the drawing:

Figure 1 is a side elevation with parts appearing in section showing the construction of my improvements and their application to a usual type of motor vehicle and, Fig. 2 is a transverse section in a vertical plane through the steam expansion dome.

Fig. 3 is a horizontal section on the center line of the valve 28.

The structure is applicable to various form of motor vehicles, and I have illustrated a conventional form of automobile merely by way of example, omitting the body and running gear which is unnecessary to an understanding of my invention. In the structure shown, 1 designates the engine provided with the exhaust manifold 2 and inlet manifold 3. 4 is the radiator, 5 designates the lower portion of the wind shield, and 6 is the instrument board, disposed in advance of the front seat, as common in automobile construction.

In order to obtain a temperature indication, I employ a thermometer having an indicating portion 7 and a bulb or heat responsive element 8. The thermometer is located upon the instrument board so as to be within the immediate vision of the driver under all conditions and is controlled by a supply of steam coming from the water jacket mixed with air, or by air alone, which is furnished to a conductor that passes through the engine water jacket at a point subject to the maximum heat when in regular operation. Thus I obtain an indication of the true condition of the engine, or in other words, a knowledge of its condition at the hottest point.

The conductor referred to embodies a passage 9 which extends from a steam expansion dome 10 downwardly through the water jacket, and thence upwardly and connects with a pipe 11. The dome 10 has side walls 23 of wicking or similar porous material retained by perforate metal plates 24 to admit air, which is filtered as it enters. An inlet tube 25 is arranged in the dome 10, and communicates with the passage 9, for supplying air thereto, while 26 is a passage leading upwardly from the water jacket to the expansion dome, and carrying thereto a supply of steam which is mixed with the incoming filtered air entering through the porous side walls, and carried thence into the passage 9. The mixture of air and steam travels through the passage 9, and is subjected to the heat of the water jacket before entering the pipe 11. The dome 10 is high enough above the water cooling system level to ordinarily prevent water from backing up into it, but in case of an excessive water column, the water will overflow the walls 27, and be prevented from entering inlet 25 which is above the top of said walls 27.

The pipe 11 is coiled, as shown, to permit expansion and contraction, and communicates with a chamber 12, formed in a casting or support 13 mounted upon the instrument board. The dome 10 permits the steam to spread and expand, eliminating the surplus moisture more or less, while the expanded hot vapor mixed with air, travels on to the heat responsive element, and thus an improved combustible mixture of air and steam is secured.

The bulb 8 of the thermometer is located in the chamber 12, and the latter is connected through a port 16 and a passage 17, with a conducting pipe 18 which leads to the intake manifold 3. As the engine becomes heated and the water in the circulating system converted into steam, this steam rises in the passage 26, entering the dome 10, where it is expanded and mixed with an adequate air supply. This mixture is again subjected to the heat of the water jacket and then passes to the chamber in which the heat responsive element is located. By observing the thermometer at any given moment, the temperature of the water at the hottest point of the circulating system can be noted.

The air and steam may be drawn to the thermometer chamber in various ways, as by pressure or suction, manually controlled or automatic, and I prefer to do this by utilizing the suction of the engine, connecting the thermometer chamber with the intake manifold as already mentioned. The steam rises into the dome 10, where it expands, and the air and steam mixture is then drawn in contact with the heat responsive element by the suction of the engine, after which it passes through the port 16 and passage 17, and is drawn thence to the intake manifold 3. The supply of water entering the intake manifold in a hot vaporous condition is of considerable assistance in securing more perfect combustion as well recognized by explosive engine engineers, and also serves in a most effectual way to constantly clean the valves and interior engine parts. Different atmospheric conditions, however, make it desirable to feed the steam to the inlet manifold in varying quantities. To accomplish this, I employ adjustable steam supplying means in the form of a manually controlled valve 19, which is movable toward and from the port 16. The adjustable valve 19 is located in the support 13 upon the instrument board and is thus within easy reach of the driver, and can be positioned at any desired point while a vehicle is moving to suit the variance of conditions under which the engine may be operated.

In case it be desired to eliminate the steam supply, and furnish only air to the intake manifold, the passage 26 can be closed by valve 28, so that only air will be drawn into passage 9, and the air will be sufficiently heated in passing through the water jacket to give a proper temperature indication.

The scope of my invention is not to be determined by the precise form or arrangement of parts shown, since the underlying principle of operation may be carried out in a variety of ways. I intend to cover by this application any modified arrangement which may incorporate the salient idea of carrying air or steam or both into contact with the hottest portion of an engine water cooling system and thence to a heat responsive element, with the temperature indicator located within close view of the vehicle driver, and further in utilizing the suction of the engine for circulating the air and steam and feeding it in desirable proportions to the engine, along with the combustible mixture.

I claim as my invention:

1. In a motor vehicle, the combination with an engine having a water jacket of a temperature indicator having a heat responsive element, a chamber surrounding said heat responsive element, a fluid conductor leading through said water jacket and to said chamber and adapted to conduct fluid to said chamber at the temperature of the water jacket, and suction means connected to said chamber for causing the fluid to flow therethrough.

2. In a motor vehicle, the combination with an engine and water jacket, of a temperature indicator located so as to be readily readable under all conditions from the driver's seat and including a heat responsive element, a chamber surrounding the heat responsive element, a fluid conductor leading through the water jacket to said chamber, and a pipe leading from said chamber to the intake manifold.

3. In a motor vehicle, the combination with an engine and water jacket, of a temperature indicator located upon the instrument board of the vehicle in front of and within the immediate vision of the driver and including a heat responsive element, a chamber surrounding the heat responsive element, a fluid conductor leading through a portion of the water jacket subject to maximum heat to said chamber, a pipe leading from said chamber to the intake manifold, and adjustable means located on the instrument board for controlling the supply of fluid to said pipe and the intake manifold.

4. In a motor vehicle, the combination with an engine and water jacket, of a temperature indicator located so as to be readily readable under all conditions from the driver's seat and including a heat responsive element, a chamber surrounding it, an expansion dome having an air inlet, a steam passage connecting the water jacket with the expansion dome, a fluid conductor leading from the expansion dome through the water jacket to said chamber, and a pipe leading from said chamber to the intake manifold.

5. In a motor vehicle, the combination with an engine and water jacket, of a temperature indicator located so as to be readily readable under all conditions from the driver's seat and including a heat responsive element, a chamber surrounding it, a dome having an air inlet, a fluid conductor leading from said dome through the water jacket and to said chamber, and a pipe leading from said chamber to the intake manifold.

6. In a motor vehicle, the combination with an engine and water jacket, of a temperature indicator located so as to be readily readable under all conditions from the driver's seat and including a heat responsive element, a chamber surrounding it, a conductor leading through the water jacket and to said chamber, and means for introducing air into said conductor.

7. In a motor vehicle, the combination with an engine and water jacket, of a temperature indicator located so as to be readily readable under all conditions from the driver's seat and including a heat responsive element, a chamber surrounding it, a conductor leading through the water jacket and to said chamber, and means for introducing steam from the water jacket into said conductor.

8. In a motor vehicle, the combination with an engine and water jacket, of a temperature indicator located so as to be readily readable under all conditions from the driver's seat and including a heat responsive element, a chamber surrounding it, a conductor leading through the water jacket and to said chamber, and means for introducing steam from the water jacket and air into said conductor.

9. In a motor vehicle, the combination with an engine having a water jacket, of a temperature indicator arranged to be readily readable from the driver's seat and including a heat responsive element, a chamber surrounding said heat responsive element, an expansion dome having an air inlet, a fluid conductor leading from said dome through the water jacket to said chamber, means for mixing steam with the air in the expansion dome, and means for causing fluid to flow through said chamber and conductor.

10. In a motor vehicle, the combination with an engine having a water jacket of a temperature indicator arranged to be readily readable from the driver's seat and including a heat responsive element, a chamber surrounding said heat responsive element, an expansion dome, a steam passage connecting said dome and said water jacket, a conductor leading from said dome through the water jacket and to said chamber, and means for causing steam to flow through said conductor to said chamber.

GEORGE W. KELLOGG.

Copies of this patent may be obtained for five cents each, by addressing the "Commissioner of Patents, Washington, D. C."